US012614783B2

(12) United States Patent
Lee

(10) Patent No.: US 12,614,783 B2
(45) Date of Patent: Apr. 28, 2026

(54) ENERGY SYSTEM

(71) Applicant: SK On Co., Ltd., Seoul (KR)

(72) Inventor: Gae Min Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 603 days.

(21) Appl. No.: 18/080,384

(22) Filed: Dec. 13, 2022

(65) Prior Publication Data

US 2023/0187731 A1 Jun. 15, 2023

(30) Foreign Application Priority Data

Dec. 14, 2021 (KR) ........................ 10-2021-0178604

(51) Int. Cl.
| | |
|---|---|
| *H01M 10/6563* | (2014.01) |
| *H01M 10/42* | (2006.01) |
| *H01M 10/613* | (2014.01) |
| *H01M 10/627* | (2014.01) |
| *H01M 50/224* | (2021.01) |
| *H01M 50/251* | (2021.01) |

(52) U.S. Cl.
CPC ..... *H01M 10/6563* (2015.04); *H01M 10/425* (2013.01); *H01M 10/613* (2015.04); *H01M 10/627* (2015.04); *H01M 50/224* (2021.01); *H01M 50/251* (2021.01); *H01M 2010/4271* (2013.01); *H01M 2220/10* (2013.01)

(58) Field of Classification Search
CPC ........... H01M 10/6563; H01M 10/613; H01M 10/627; H01M 10/425; H01M 50/251; H01M 50/224; H01M 2010/4271; H01M 2220/10
See application file for complete search history.

(56) References Cited

U.S. PATENT DOCUMENTS

| | | | |
|---|---|---|---|
| 5,791,150 A | 8/1998 | Bosher et al. | |
| 9,086,224 B2 | 7/2015 | Senaydin | |
| 2005/0178299 A1 | 8/2005 | Rasmussen et al. | |
| 2014/0054196 A1* | 2/2014 | Schaefer ............. | H01M 50/231 |
| | | | 206/703 |
| 2014/0103548 A1* | 4/2014 | Senaydin ............. | B65D 81/263 |
| | | | 261/31 |
| 2021/0399362 A1* | 12/2021 | Tang .................. | H01M 10/6561 |
| 2022/0305938 A1* | 9/2022 | Healy ................... | H02J 7/0045 |

FOREIGN PATENT DOCUMENTS

| | | |
|---|---|---|
| KR | 10-1997-0701333 A | 3/1997 |
| KR | 2000-0037361 A | 7/2000 |
| KR | 10-2014-0015336 A | 2/2014 |
| WO | 2012-173579 A1 | 12/2012 |
| WO | WO-2020102909 A1 * | 5/2020 ........ H01M 10/4257 |

OTHER PUBLICATIONS

Office Action for the Korean Patent Application No. 10-2021-0178604 issued by the Korean Intellectual Property Office on Feb. 13, 2026.

* cited by examiner

*Primary Examiner* — James Lee
(74) *Attorney, Agent, or Firm* — IP & T GROUP LLP

(57) ABSTRACT

An energy system according to an embodiment of the present disclosure may include: a pallet including a base having an insertion portion to which a transport means is coupled and a fan assembly detachably inserted into the insertion portion and including at least one fan; and at least one reuse battery seated on the pallet.

14 Claims, 6 Drawing Sheets

ENERGY SYSTEM

CROSS-REFERENCE TO RELATED APPLICATION(S)

This application claims the benefit under 35 USC 119(a) of Korean Patent Application No. 10-2021-0178604 filed on Dec. 14, 2021 in the Korean Intellectual Property Office, the entire disclosure of which is incorporated herein by reference for all purposes.

BACKGROUND

The present disclosure relates to an energy system using at least one reuse battery.

In recent years, an electric vehicle (hereinafter, referred to as an electric vehicle) is recognized as a useful measure to dramatically reduce gas emissions such as greenhouse gases, fine dust, or the like. Accordingly, the market for electric vehicles is growing, based on the government supply policies. With the proliferation of electric vehicles, the scale of waste batteries removed from electric vehicles is also expanding.

Even if performance of a battery of an electric vehicle deteriorates and becomes unsuitable as a power source for an electric vehicle, the battery may be sufficiently reused for other purposes. A battery that is reused in this scheme is called a reuse battery or a reused battery. For example, the battery for an electric vehicle can be reused in an energy storage system after the end of its useful lifespan in an electric vehicle.

Before being reused for other purposes, a reuse battery undergoes a performance test, reinstallation process, or the like, and accordingly, movement of a location of the reuse battery is relatively frequently performed. Therefore, there is a need for a device that can easily transport the reuse battery.

In addition, since the battery may generate heat during charging or discharging, and if this heat is not properly controlled, the performance of the battery itself deteriorates as well as may lead to a fire of the battery, in order to manage the performance and safety of the battery, a device for cooling the battery is required.

Meanwhile, since electric vehicle manufacturers respectively make very different types of battery packs, it is necessary to introduce a general-purpose cooling jig that can manage a temperature of the battery while making it easy to transport various types of battery packs.

SUMMARY

An aspect of the present disclosure is to provide an energy system effectively using at least one reuse battery. Specifically, an aspect of the present disclosure is to provide an energy system capable of easily transporting or mounting at least one reuse battery and cooling the at least one reuse battery.

According to an aspect of the present disclosure, an energy system may include: a pallet including a base having an insertion portion to which a transport means is coupled and a fan assembly detachably inserted into the insertion portion and including at least one fan; and at least one reuse battery seated on the pallet.

In an embodiment, the pallet may include a plurality of ventilation holes communicating the insertion portion and an upper space of the pallet, and air flowing by the fan may pass through the plurality of ventilation holes.

In addition, in an embodiment, the pallet may have a form of a four-way pallet.

In addition, in an embodiment, the pallet may include an upper plate disposed on the base and including a metal material, and the at least one reuse battery may be seated on the upper plate.

In addition, in an embodiment, the base may have a form of a rectangular plate surrounded by four side surfaces, and the two or more insertion portions may be disposed on at least one of the four side surfaces, and the fan assembly may be inserted into at least one of the insertion portions.

In addition, in an embodiment, the fan assembly may include a first fan assembly and a second fan assembly, mechanically connected to each other, and the first fan assembly and the second fan assembly may respectively be inserted into different insertion hole insertion portions among the insertion hole insertion portions.

In addition, in an embodiment, the at least one reuse battery may be electrically connected to an electrical grid, and may receive power from the electrical grid or supply power to the electrical grid.

In addition, in an embodiment, the energy system may include a battery management system connected to the at least one reuse battery, a battery protection unit, a power management system, or a combination of two or more of the battery management system, the battery protection unit, and the power management system.

In addition, in an embodiment, the transport means may be a forklift, and the insertion portion can be an insertion hole into which a fork of the forklift may be inserted.

Meanwhile, another aspect of the present disclosure is to provide a pallet.

A pallet according to an embodiment of the present disclosure may include: a base including an insertion portion to which a transport means is coupled; and a fan assembly detachably inserted into the insertion portion and including at least one fan.

In an embodiment, the pallet may include a plurality of ventilation holes communicating the coupling portion and an upper space of the pallet, and air flowing by the fan may pass through the plurality of ventilation holes.

In addition, in an embodiment, the pallet may have a form of a four-way pallet.

In addition, in an embodiment, the base has a form of a rectangular plate surrounded by four side surfaces, the two or more insertion portions may be disposed on at least one of the four side surfaces, and the fan assembly may be inserted into at least one of the insertion portions.

In addition, in an embodiment, the transport means may be a forklift, and the insertion portion may be an insertion hole into which a fork of the forklift may be inserted.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
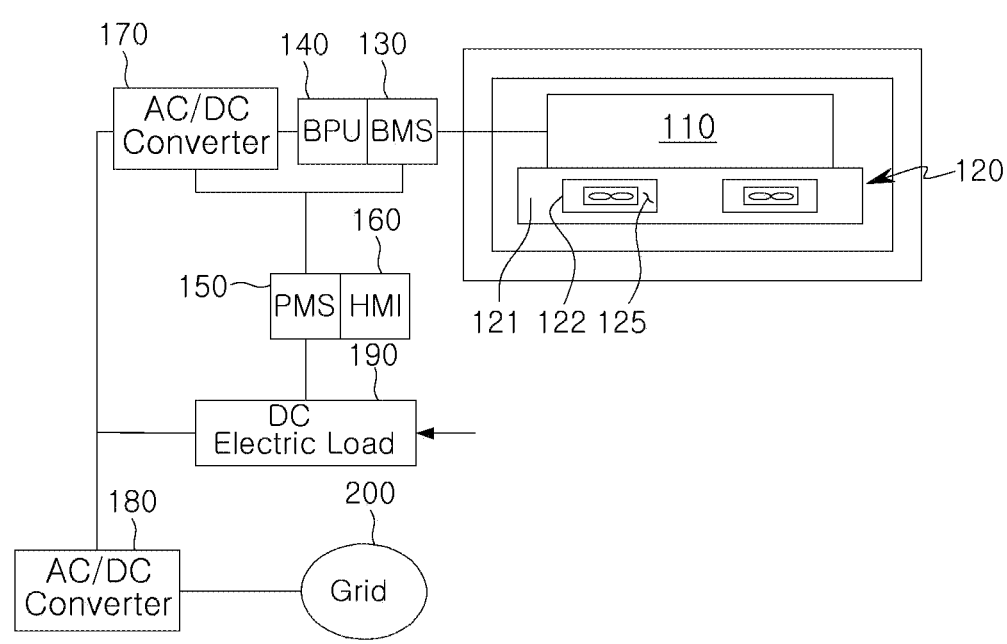
FIG. 1 illustrates a reuse energy system according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "including", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

In addition, in this document, terms including an ordinal number such as "first" and "second" may be used to distinguish between elements. This ordinal number is used to distinguish the same or similar components from each other, and the meaning of the term should not be construed as limited due to the use of the ordinal number. As an example, the components combined with such an ordinal number should not be construed as limiting the order of use or arrangement by the number. If necessary, each ordinal number may be used interchangeably. For example, a component described herein as a first member is termed a second member. A component described as a second member may be referred to as a first member.

In this document, the singular expression includes the plural expression unless the context clearly indicates otherwise. That is, even if a component is expressed in a singular form in this document, it should not be construed as excluding the provision of a plurality of components unless otherwise specified. For example, when it is assumed that a first member is disposed on the frame in some embodiments, it should be understood that the embodiment is not limited to only one first member disposed on the frame, unless otherwise specified, and two or more first members may be disposed on the frame.

In this document, terms such as "comprises" or "comprises" are intended to designate the presence of a feature, number, step, operation, component, part, or combination thereof described in this document, but one or more other It should be understood that this does not preclude the possibility of addition or presence of features or numbers, steps, operations, components, parts, or combinations thereof.

Paragraphs beginning with "in one embodiment" in this document do not necessarily refer to the same embodiments.

The particular features, structures, or characteristics may be combined in any suitable manner consistent with this document.

In this document, "configured to" means that a component includes a structure necessary to implement a certain function.

Hereinafter, an embodiment of the present disclosure will be described in detail with reference to the drawings. However, the spirit of the present disclosure is not limited to the presented embodiment Those skilled in the art and understanding the spirit of the present disclosure could readily suggest other embodiments included in the scope of the present inventive concept through additions, alterations, deletions, or the like, of elements, but these will be also included within the scope of the present disclosure.

Figure 2:
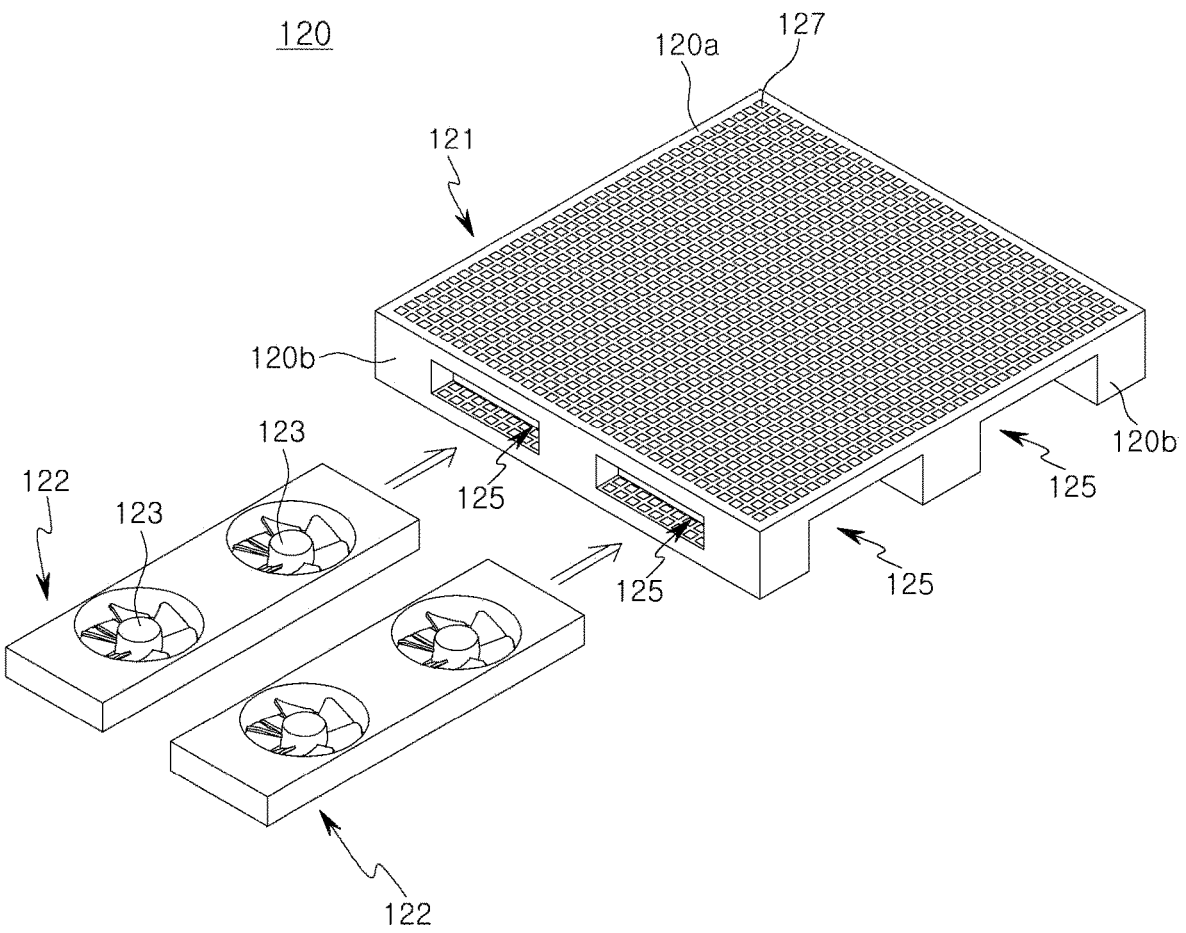
FIG. 2 illustrates a pallet on which at least one reuse battery is seated and a fan assembly inserted into the pallet in an embodiment.
Figure 3:
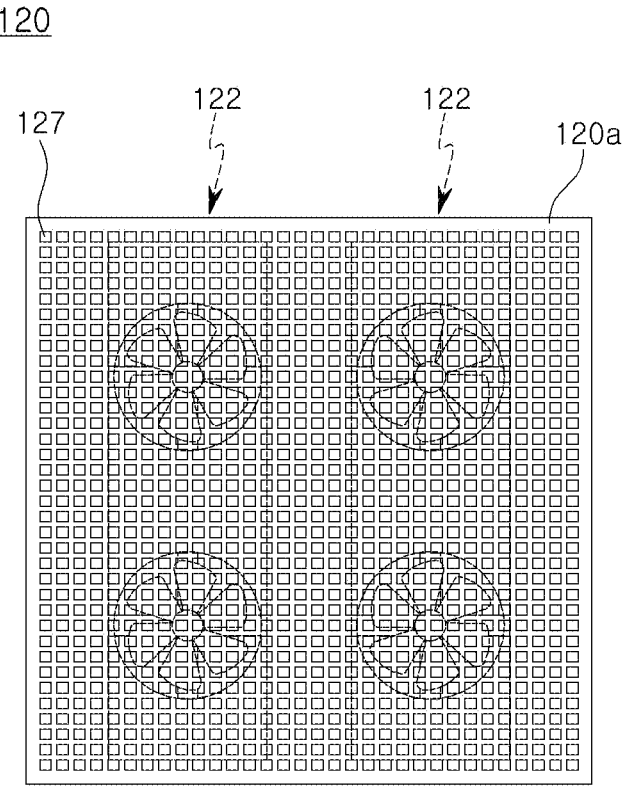
FIG. 3 is an upper view of a pallet in an embodiment.

FIG. 1 illustrates an energy system according to an embodiment. FIG. 2 illustrates a pallet on which a reusable battery is seated in an embodiment and a fan assembly inserted into the pallet. FIG. 3 is an upper view of a pallet in one embodiment.

Referring to FIG. 1, in an embodiment, an energy system 100 includes a pallet 120 and at least one reuse battery 110 seated on the pallet 120. In this disclosure, the reuse battery 110 is a battery used in an electric vehicle, or the like, and refers to a battery that has reached an end of a useful lifespan thereof. For example, performance of a battery pack of the electric vehicle is reduced to a certain extent, as the battery of the electric vehicle, it will end a lifespan thereof, and cannot be used in the electric vehicle. However, the battery pack can be sufficiently used for purposes other than electric vehicles. For example, a battery pack of an electric vehicle may be reused as a battery of an energy storage system (ESS). This is because it is determined whether a battery may be used in an electric vehicle by a performance warranty period thereof, not battery life itself. For example, the performance warranty period for an electric vehicle battery is from 5 to 10 years, but it does not mean that a lifespan of the electric vehicle battery is itself 5 to 10 years. Usually, the performance warranty period of electric vehicles means a time point at which charging capacity drops below 80% of original storage capacity. Due to the characteristics of a vehicle that must momentarily generate high output, if the storage capacity drops below 80%, it may cause a risk to an operation of the vehicle, and the performance warranty period is also set in this regard. Therefore, even batteries that are no longer suitable for use in electric vehicles can be sufficiently reused for other uses that do not require large-scale output adjustment. That is, after being installed in an electric vehicle and used once, the discharged battery can be reused for other purposes. In this document, the reuse battery 110 is a concept that includes a battery that has been used for purposes other than electric vehicles.

Referring to FIGS. 1 to 3, in an embodiment, the pallet 120 may include a cooling unit for cool the reuse battery 110. The cooling unit absorbs heat generated during a charging and discharging process of the reuse battery 110, and allows the reuse battery 110 to operate stably.

The cooling unit may include a fan assembly 122. The fan assembly 122 may include at least one fan, and may be coupled to a pallet 120 to cool the reuse battery 110 disposed on the pallet 120. The fan assembly 122 may be detachably coupled to the pallet 120.

The energy system 100 may be connected to an electrical grid 200. The energy system 100 may receive power from the electrical grid 200 and charge a reuse battery 110. Conversely, the energy system 100 may supply power to the electrical grid 200 (or other electronic equipment) by discharging the reuse battery 110. For example, the energy system 100 may supply power by charging the reuse battery 110 during a late night time period when surplus power is generated, and discharging the reuse battery 110 during a day time period when power usage increases. Since an electricity rate during the late night time is relatively cheap, an operator of the energy system 100 according to an embodiment may obtain economic benefits by charging the battery using electricity at a low cost and then selling the electricity at a high price again during the daytime.

The energy system 100 may include various electronic components for managing a state of the battery. For example, the energy system 100 may include a battery management system (BMS) 130, a battery protection unit (BPU) 140, a power management system (PMS) 150, and the like. The battery management system 130 may manage battery cells constituting the reuse battery 110. The battery management system 130 may monitor a voltage, current, and temperature of the battery cells in real time to increase the safety and lifespan of the reuse battery 110. For example, the battery management system 130 may predict a state of charge (SOC) of the reuse battery 110 based on the measured voltage, current, or temperature, and determine a usable power range. The battery management system 130 may control an amount of charging or discharging based on an available power range.

The battery management system 130 may balance voltages of a plurality of battery cells constituting the reuse battery 110 to optimize energy of the reuse battery 110. In addition, by controlling a cooling unit to manage heat generated during charging or discharging of the reuse battery 110, it is possible to delay a decrease in a lifespan of the reuse battery 110. For example, the battery management system 130 may control the fan assembly 122 to manage a temperature of the reuse battery 110 seated on the pallet 120. In addition thereto, the battery management system 130 may perform various control operations to increase the stability and lifespan of the reuse battery 110.

The power management system 150 may operate the reuse battery 110 in connection with the electrical grid 200. For example, the power management system 150 may control whether power of the reuse battery 110 is supplied to the electrical grid 200 or whether power is supplied from the electrical grid 200 to the reuse battery 110. For example, the power management system 150 may control transmitting direction between the reuse battery 110 and the electrical grid 200 after use thereof, based on a time period.

The energy system 100 may include a DC/DC converter 170. The DC/DC converter 170 may change or stabilize a voltage. The DC/DC converter 170 may be connected to a BPU, BMS, PMS, and the like.

The energy system 100 may include an AC/DC converter 180. Electricity used in the electrical grid 200 is alternating current, the reuse battery 110 may operate as direct current, and the AC/DC converter 180 may convert alternating current to direct current when transmitting power between the electrical grid 200 and the reuse battery 110 or covert a direct current voltage to an alternating current voltage. The energy system 100 may include a human machine interface (HMI) 160. Through the HMI 160, an operator can check a state of the reuse battery 110. The energy system 100 may include a DC load 190.

Referring to FIG. 2, in an embodiment, the pallet 120 includes a base 121 and a fan assembly 122 disposed inside the base 121.

The pallet 120 may be configured to facilitate transportation of the reuse battery 110. In an embodiment, the pallet 120 may include an insertion portion into which a transport means may be inserted.

In an embodiment of the present disclosure, the transport means may be a forklift. In addition, in an embodiment of the present disclosure, the insertion portion may include an insertion hole 125 into which a fork of a forklift can be inserted.

The fan assembly 122 may include at least one fan 123. Referring to FIG. 2, for example, the fan assembly 122 may include two fans 123. In another embodiment, the fan assembly 122 may include one or three or more fans 123.

For example, the pallet 120 may be provided in a form of a rectangular plate surrounded by four side surfaces 120*b* facing each of four directions, and an insertion hole 125 into which a fork of the forklift can be inserted may be formed in at least one of the four side surfaces 120*b*. Referring to FIG. 2, the base 121 may include two insertion holes 125 on one side surface 120*b*, and two forks of the forklift may be inserted into the two insertion holes 125, respectively. For example, the pallet 120 may have a form of a four-way pallet.

The fan assembly 122 may be inserted into the insertion hole 125 of the base 121. Referring to FIG. 2, the fan assembly 122 may be disposed inside the two insertion holes 125 opened to one side surface of the base 121. The fan assembly 122 may be detachably coupled to the base 121.

In an embodiment, the pallet 120 may include a plurality of ventilation holes 127 communicating the insertion hole 125 and an upper space of the pallet 120. Air flowing by the fan assembly 122 may pass through a plurality of ventilation holes 127. Referring to FIGS. 2 and 3, the ventilation holes 127 may have a square column shape, and may be arranged in a grid shape on the upper surface 120*a* of the pallet 120. However, this is only an example, and the shape or arrangement of the ventilation hole 127 may vary.

Figure 4:
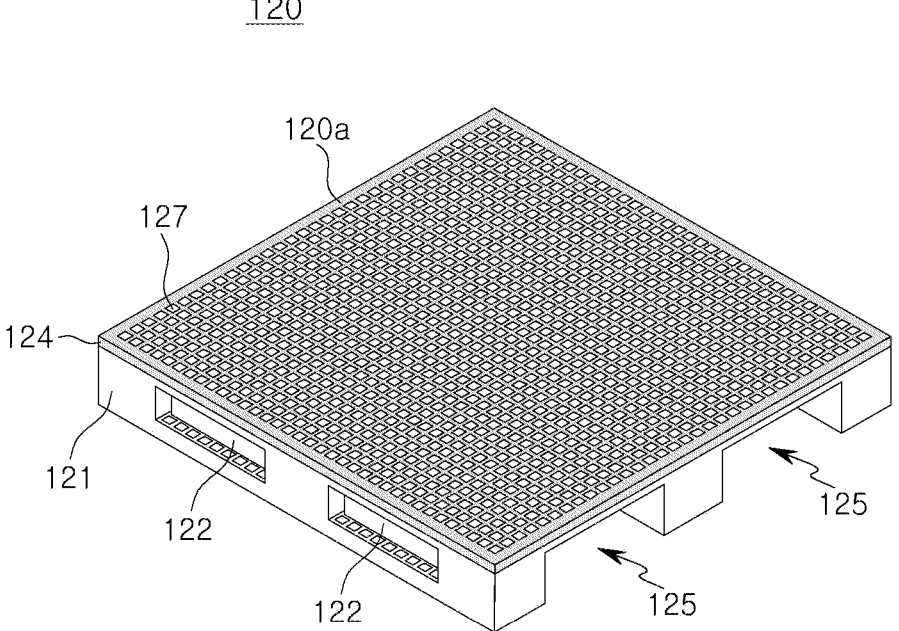
FIG. 4 illustrates that an upper portion of the pallet is formed of metal in an embodiment.

FIG. 4 illustrates that an upper portion of the pallet is formed of metal in an embodiment.

In an embodiment, the pallet 120 may include an upper plate 124 disposed on the base 121. The upper plate 124 may constitute a portion or all of an upper surface 120*a* of the pallet 120. The upper plate 124 may be formed of a material having high thermal conductivity. For example, the upper plate 124 may include a material such as aluminum or copper. Accordingly, the upper plate 124 may function as a heat sink. That is, heat generated from the reuse battery 110 seated on the upper plate 124 may be rapidly propagated to the upper plate 124. A fan assembly 122 may be disposed below the upper plate 124, and the heat of the upper plate 124 may be rapidly dissipated into the air according to an operation of the fan assembly 122. Referring to FIG. 4, the ventilation hole 127 may be formed in the upper plate 124, which may increase a cooling effect due to the fan assembly 122.

Figure 5:
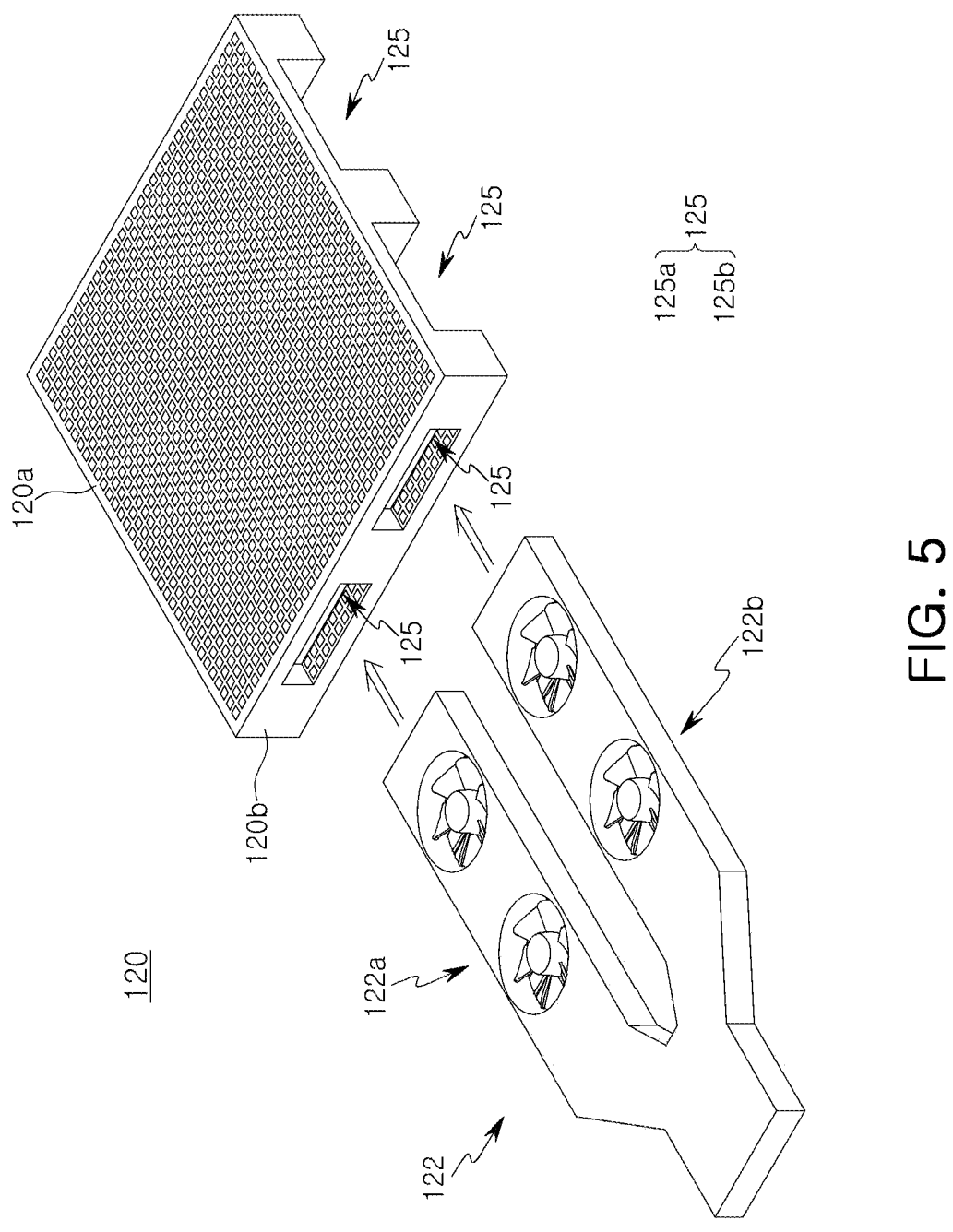
FIG. 5 illustrates a fan assembly that is inserted into both insertion holes provided on one side of the pallet.

FIG. 5 illustrates a fan assembly according to an embodiment.

In an embodiment, the fan assembly 122 may be inserted into two or more insertion holes 125 opened to one side of the pallet 120 at a time. For example, a first fan assembly 122*a* and a second fan assembly 122*b* may be inserted into the first insertion hole 125*a* and the second insertion hole 125*b* of the pallet 120, respectively, and the first fan assembly 122*a* and the second fan assembly 122*b* may be mechanically connected. Referring to FIG. 2, the two fan assemblies 122 are respectively independently inserted into the two insertion holes 125 formed on one side surface of the pallet 120. On the other hand, referring to FIG. 5, the two fan assemblies 122a and 122b may be mechanically connected to each other to be integrally formed, and the two fan assemblies 122a and 122b may be inserted into the two insertion holes 125a and 125b formed in one side surface 120b of the pallet 120 at a time.

Figure 6:
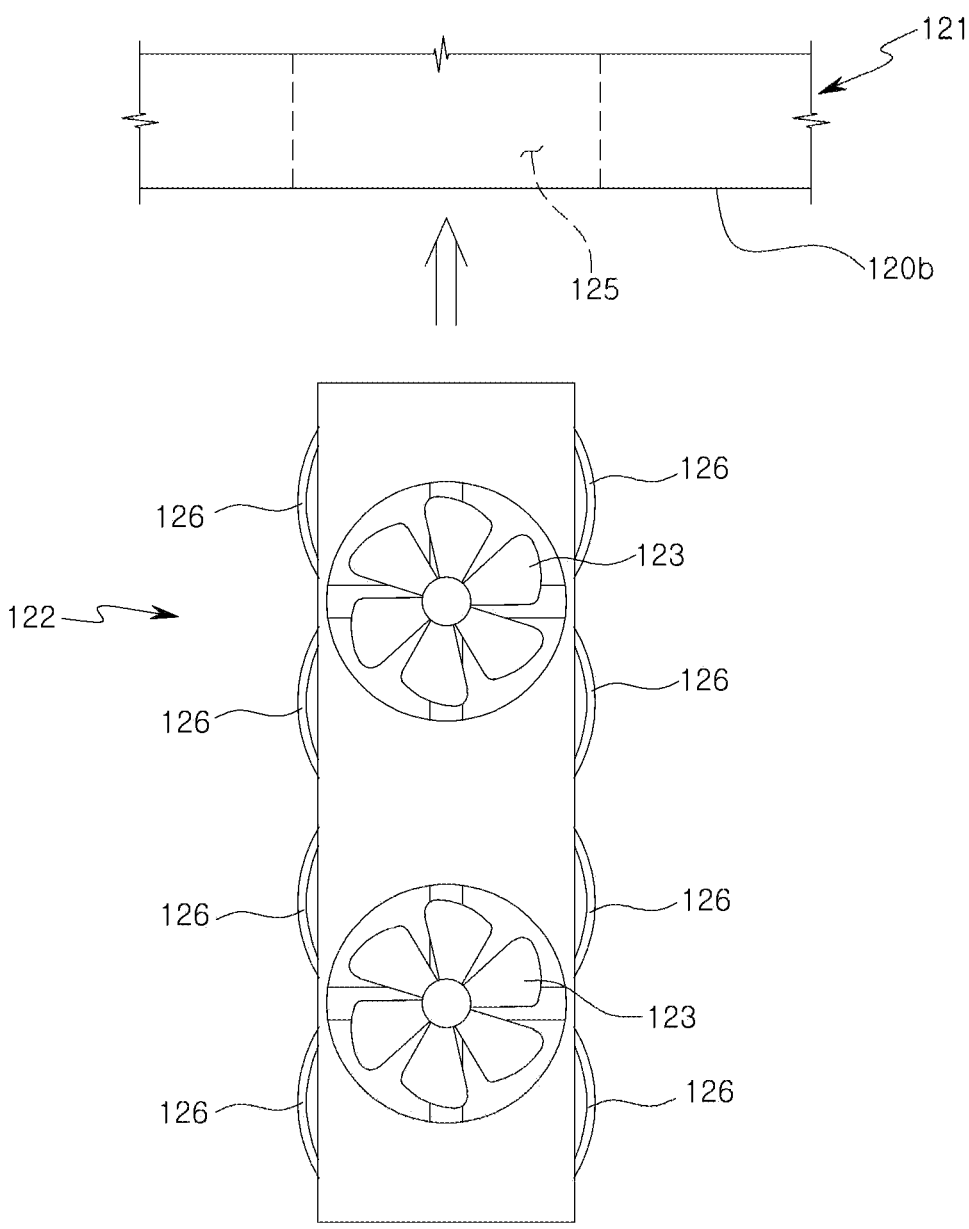
FIG. 6 illustrates a fan assembly including an elastic member for fixing according to an embodiment.

FIG. 6 illustrates a fan assembly 122 including an elastic member 126 for fixing in an embodiment.

The fan assembly 122 may include an elastic member 126 preventing the fan assembly 122 from being easily separated from the insertion hole 125 of the base 121. The elastic member 126 may be mounted on an outside of the fan assembly 122 and when the fan assembly 122 is inserted into the insertion hole 125 located on a side surface 120b of the base 121, the elastic member 126 may stably fix the fan assembly 122 inside the insertion hole 125 while being compressed. In an embodiment, the elastic member 126 may have a form of a leaf spring. For example, the elastic member 126 may be a plate spring mounted on a side surface of the fan assembly 122, and convexly bent outwardly.

As set forth above, according to embodiments of the present specification, an energy system effectively using a reuse battery after is provided. According to an embodiment, the reuse battery may be easily transported or mounted. Heat generated during charging and discharging the reuse battery may be effectively removed, so that the reuse battery may operate stably.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

DESCRIPTION OF REFERENCE NUMERALS

100: Energy system
110: Reuse battery
120: Pallet
121: Base
122: Fan assembly
123: Fan
124: Upper plate
125: Insertion hole
126: Elastic member

What is claimed is:

1. An energy system, comprising:
   a pallet including a base having an insertion portion to which a forklift is coupled and a fan assembly detachably inserted into the insertion portion and including at least one fan; and
   at least one reuse battery seated on the pallet,
   wherein the fan assembly includes an elastic member mounted on an outside of the fan assembly, wherein the elastic member fixes the fan assembly inside the insertion portion.

2. The energy system of claim 1, wherein the pallet comprises a plurality of ventilation holes communicating the insertion portion and an upper space of the pallet, wherein air flowing by the at least one fan passes through the plurality of ventilation holes.

3. The energy system of claim 1, wherein the pallet has a form of a four way pallet.

4. The energy system of claim 1, wherein the pallet comprises an upper plate disposed on the base and including a metal material, and the at least one reuse battery is seated on the upper plate.

5. The energy system of claim 1, wherein the base has a form of a rectangular plate surrounded by four side surfaces, and two or more insertion portions are disposed on at least one of the four side surfaces,
   wherein the fan assembly is inserted into at least one insertion portion of the two or more insertion portions.

6. The energy system of claim 5, wherein the fan assembly comprises a first fan assembly and a second fan assembly that are mechanically connected to each other, and
   wherein the first fan assembly and the second fan assembly are respectively inserted into different insertion portions among the two or more insertion portions.

7. The energy system of claim 1, wherein the at least one reuse battery is electrically connected to an electrical grid, and receives power from the electrical grid or supplies power to the electrical grid.

8. The energy system of claim 1, further comprising at least one of:
   a battery management system connected to the at least one reuse battery,
   a battery protection unit connected to the at least one reuse battery, and
   a power management system connected to the at least one reuse battery.

9. The energy system of claim 1,
   wherein the insertion portion is an insertion hole into which a fork of the forklift can be inserted.

10. A pallet, comprising:
   a base including an insertion portion to which a forklift is coupled; and
   a fan assembly detachably inserted into the insertion portion and including at least one fan,
   wherein the fan assembly includes an elastic member mounted on an outside of the fan assembly,
   wherein the elastic member fixes the fan assembly inside the insertion portion.

11. The pallet of claim 10, wherein the pallet comprises plurality of ventilation holes communicating the insertion portion and an upper space of the pallet, and air flowing by the at least one fan passes through the plurality of ventilation holes.

12. The pallet of claim 10, wherein the pallet has a form of a four-way pallet.

13. The pallet of claim 10, wherein the base has a form of a rectangular plate surrounded by four side surfaces, and two or more insertion portions are disposed on at least one of the four side surfaces,
   wherein the fan assembly is inserted into at least one of the two or more insertion portions.

14. The pallet of claim 10,
   wherein the insertion portion is an insertion hole into which a fork of the forklift can be inserted.

* * * * *